United States Patent
Park

(10) Patent No.: US 9,360,306 B2
(45) Date of Patent: Jun. 7, 2016

(54) THREE-DIMENSIONAL PROFILE MEASUREMENT APPARATUS AND METHOD USING AMPLITUDE SIZE OF PROJECTION GRID

(75) Inventor: Yoon Deok Park, Seoul (KR)

(73) Assignee: INSPECTO INC., Asan-si, Chungcheongnam-do (KR)

( * ) Notice: Subject to any disclaimer, the term of this patent is extended or adjusted under 35 U.S.C. 154(b) by 282 days.

(21) Appl. No.: 14/343,052

(22) PCT Filed: Sep. 7, 2012

(86) PCT No.: PCT/KR2012/007233
§ 371 (c)(1),
(2), (4) Date: Mar. 6, 2014

(87) PCT Pub. No.: WO2013/036076
PCT Pub. Date: Mar. 14, 2013

(65) Prior Publication Data
US 2014/0198320 A1    Jul. 17, 2014

(30) Foreign Application Priority Data

Sep. 9, 2011  (KR) .................. 10-2011-0092042
Sep. 7, 2012  (KR) .................. 10-2012-0099230

(51) Int. Cl.
| | |
|---|---|
| *G01B 11/30* | (2006.01) |
| *G01J 1/00* | (2006.01) |
| *G01B 11/00* | (2006.01) |
| *G03F 9/00* | (2006.01) |
| *G03C 5/00* | (2006.01) |
| *G03B 27/58* | (2006.01) |
| *G03B 27/54* | (2006.01) |

(Continued)

(52) U.S. Cl.
CPC .............. *G01B 11/254* (2013.01); *G01B 11/25* (2013.01)

(58) Field of Classification Search
CPC .......... A61B 3/12; G03F 7/701; G03F 7/705; G03F 7/70125; G03F 7/70108; G03F 9/7026; G03F 9/7034; G01B 11/254
USPC ............ 356/610, 609, 123, 394, 400; 430/22, 430/30, 394, 396, 401; 355/72, 67, 53, 77
See application file for complete search history.

(56) References Cited

U.S. PATENT DOCUMENTS

| | | | | |
|---|---|---|---|---|
| 4,748,335 A | * | 5/1988 | Lindow | G01B 11/02 250/559.22 |
| 4,900,144 A | * | 2/1990 | Kobayashi | A61B 3/12 250/559.22 |
| 4,920,273 A | * | 4/1990 | Sacks | G01B 11/0608 250/559.08 |

(Continued)

FOREIGN PATENT DOCUMENTS

| | | |
|---|---|---|
| JP | 2005-003545 A | 1/2005 |
| KR | 10-2002-0078596 A | 10/2002 |

(Continued)

*Primary Examiner* — Tarifur Chowdhury
*Assistant Examiner* — Sunghee Y Gray
(74) *Attorney, Agent, or Firm* — Revolution IP, PLLC

(57) ABSTRACT

Disclosed are a three-dimensional profile measurement apparatus and method using the amplitude size of a projection grid wherein a periodic pattern of the projection grid is projected onto an object to be measured, the amplitude of the projection grid is obtained through the change of the pattern of the projection grid, and the amplitude size is continuously obtained while moving the object upwards and downwards, thus measuring the three-dimensional profile of the object.

17 Claims, 9 Drawing Sheets

(51) Int. Cl.
*G03B 27/42* (2006.01)
*G01B 11/25* (2006.01)

(56) References Cited

U.S. PATENT DOCUMENTS 5,747,202 A * 5/1998 Tanaka ................ G03F 7/70591
 355/53
6,195,154 B1 * 2/2001 Imai ..................... G03F 9/7026
 355/53
2002/0015158 A1 * 2/2002 Shiode .................. G03F 9/7026
 356/614
2009/0073409 A1 * 3/2009 Nishino ................ G03F 9/7034
 355/55
2009/0268212 A1 10/2009 Ko et al.

FOREIGN PATENT DOCUMENTS

| KR | 10-0598572 B1 | 7/2006 |
| KR | 10-2009-0101661 A | 9/2009 |
| KR | 10-2011-0017679 A | 2/2011 |

* cited by examiner

THREE-DIMENSIONAL PROFILE MEASUREMENT APPARATUS AND METHOD USING AMPLITUDE SIZE OF PROJECTION GRID

CROSS REFERENCE TO PRIOR APPLICATIONS

This application is a National Stage Application of PCT International Patent Application No. PCT/KR2012/007233 filed on Sep. 7, 2012, under 35 U.S.C. §371, which claims priority to Korean Patent Application Nos. 10-2011-0092042 filed on Sep. 9, 2011 and 10-2012-0099230 filed on Sep. 7, 2012, which are all hereby incorporated by reference in their entirety.

TECHNICAL FIELD

The present invention relates to three-dimensional profile measurement apparatus and method using the amplitude size of a projection grid, and more particularly, to three-dimensional profile measurement apparatus and method using the amplitude size of a projection grid wherein a periodic pattern of the projection grid is projected onto an object to be measured, the amplitude of the projection grid is obtained through the change of the pattern of the projection grid, and the amplitude size is continuously obtained while moving the object upwards and downwards, thus measuring the three-dimensional profile of the object.

BACKGROUND ART

A technology for measuring a profile in a fine region using a white-light interferometer has been widely prevailed and currently utilized in various fields.

One conventional white-light interferometer is disclosed in Korean Patent No. 10-598572. In the procedure of making semiconductor and LCD, there is a process for applying a transparent thin film layer on a surface of an opaque metal layer, and at this time, some methods are proposed to measure the thickness of the transparent thin film layer or the profile of the surface of the thin film layer.

As one method for measuring the profile of the surface of the transparent thin film layer, white-light scanning interferometry has been proposed, which overcomes $2\pi$-ambiguity the conventional phase shifting interferometry has had, so that the measurement surface having rough surface or high step can be measured with high resolution.

The fundamental measurement principle of the white-light scanning interferometry makes use of the feature of the short coherence length of white light. This is based upon the principle where an interference signal is generated only when reference light and measurement light split from a beam splitter have the almost same optical path difference as each other.

Therefore, while an object to be measured is being moved by a fine distance of a nanometer through moving means like a PZT actuator in the direction of an optical axis, it is observed that short interference signals are generated at respective measurement points within the measurement region having the same optical path difference as a reference mirror.

If the positions where the interference signals are generated are calculated from all measurement points within the measurement region, the information on the three-dimensional profile of the measurement surface is obtained, and accordingly, the profile of the surface of the thin film layer can be measured from the obtained information on the three-dimensional profile.

FIG. 1 shows a conventional measurement apparatus using a white-light interferometer. As shown, the conventional measuring apparatus includes a light source 110, a beam splitting unit 150, an interference module 120, an imaging unit 140, a transferring unit 130, and a controller 160.

The light source 110 emits white light. The light source 110 emits monochromatic light, for example, white light, and uses an about 70 W tungsten-halogen lamp. In this case, the light emitted from the light source 110 is passed through an optical fiber (not shown) in the direction of the emission.

The light emitted from the optical fiber is distributed around a pin hole of a fixing member 171. While the light passed through the pin hole is being transmitted through a convex lens 172 disposed between the fixing member 171 and the beam splitting unit 150, it is arranged to a given width.

The light transmitted through the convex lens 172 is incident onto the beam splitting unit 150. In this case, the light incident onto the beam splitting unit 150, for example, a beam splitter is reflected to about 45° with respect to the incident direction thereof and thus headed for an object 100 to be measured.

The light reflected by the beam splitting unit 150 and headed for the object 100 is incident onto the interference module 120. The light incident onto the interference module 120 is split into the directions of a reference mirror and the object 100 provided in the interference module 120 and thus emitted. Coherent light is formed by the light reflected from the reference mirror and the object 100 and emitted to the beam splitting unit 150.

The imaging unit 140 images the coherent light emitted from the interference module 120 and then passed through the beam splitting unit 150 and a convex lens 174 and applies the imaged light to the controller 160.

The controller 160 controls the transferring unit 130 according to the white-light scanning interferometry to adjust the separation distance between the transferring unit 130 and the object 100. Further, the controller 160 measures the profile of the surface of the object 100, based upon the imaged data by the imaging unit 140 corresponding to the separation distance between the transferring unit 130 and the object 100.

However, such white-light scanning interferometer has a coherent section of about 2 to 4 µm and a period of interference pattern of about 0.3 µm, and so as to measure a three-dimensional profile having uneven heights, accordingly, step transferring should be needed at substantially short distances. Further, the interference pattern has to be acquired over the whole height, and accordingly, the time for the measurement becomes extended.

Such measurement method is effective under the situations wherein the object has a relatively low difference in height and mechanical vibrations are not generated, but under the situations wherein the object has a relatively high difference in height and mechanical vibrations are generated, it is hard to obtain an appropriate measurement result.

DISCLOSURE

Technical Problem

Accordingly, the present invention has been made in view of the above-mentioned problems occurring in the prior art, and it is an object of the present invention to provide three-dimensional profile measurement apparatus and method using the amplitude size of a projection grid, under the situations wherein an object to be measured has a high difference in height and mechanical vibrations exist.

It is another object of the present invention to provide three-dimensional profile measurement apparatus and method using the amplitude size of a projection grid wherein a periodic pattern of the projection grid is projected onto an object to be measured, the amplitude of the projection grid is obtained through the change of the pattern of the projection grid, and the amplitude size is continuously obtained while moving the object upwards and downwards, thus measuring the three-dimensional profile of the object.

Technical Solution

To accomplish the above-mentioned objects, according to a first aspect of the present invention, there is provided a three-dimensional profile measurement apparatus using the amplitude size of a projection grid, the apparatus including: a pattern projection unit for projecting a pattern of the projection grid onto an object to be measured having an arbitrary height, an image acquisition unit having an image sensor for acquiring a pattern image projected onto the object, a focal position movement unit for adjusting the focal position between the pattern projection unit and the image acquisition unit so as to obtain the vivid image of the pattern of the projection grid projected onto the object, a position sensor for detecting the quantity of the focal position moved, a controller for receiving the pattern image of the projection grid acquired by the image sensor and a signal from the position sensor detecting the quantity of the focal position moved, and a calculation unit for calculating the height of the object by calculating the image of the image sensor inputted to the controller and the position input signal received from the position sensor.

To accomplish the above-mentioned objects, according to a second aspect of the present invention, there is provided a three-dimensional profile measurement method using the amplitude size of a projection grid, through a three-dimensional profile measurement apparatus having a pattern projection unit for projecting a pattern of the projection grid onto an object to be measured having an arbitrary height, an image acquisition unit having an image sensor for acquiring a pattern image projected onto the object, a focal position movement unit for adjusting the focal position between the pattern projection unit and the image acquisition unit so as to obtain the vivid image of the pattern of the projection grid projected onto the object, a position sensor for detecting the quantity of the focal position moved, a controller for receiving the pattern image of the projection grid acquired by the image sensor and a signal from the position sensor detecting the quantity of the focal position moved, and a calculation unit for calculating the height of the object by calculating the image of the image sensor inputted to the controller and the position input signal received from the position sensor, the method including the steps of: arranging a plurality of pixels of the image sensor so that the image of the corresponding points of the object thereto is acquired; moving the focal position movement unit so as to obtain vivid image of the pattern of the projection grid projected onto the object and storing the quantity of focal position moved; projecting the pattern of the projection grid having a periodical component onto the object; acquiring the image of the object onto which the pattern of the projection grid is projected; projecting the pattern of the projection grid onto the object, while moving the projection grid within one period; calculating the amplitude of the pattern of the projection grid from each pixel in the acquired image; and determining the highest amplitude value of the pattern of the projection grid at each pixel.

To accomplish the above-mentioned objects, according to a third aspect of the present invention, there is provided a three-dimensional profile measurement apparatus using the amplitude size of a projection grid, the apparatus including: a pattern projection unit for projecting a pattern of the projection grid onto an object to be measured having an arbitrary height, an image acquisition unit having an image sensor for acquiring a pattern image projected onto the object, a focal position movement unit for adjusting the focal position between the pattern projection unit and the image acquisition unit so as to obtain the vivid image of the pattern of the projection grid projected onto the object, a position sensor for detecting the quantity of the focal position moved, a controller for receiving the pattern image of the projection grid acquired by the image sensor and a signal from the position sensor detecting the quantity of the focal position moved, and a calculation unit for calculating the height of the object by calculating the image of the image sensor inputted to the controller and the position input signal received from the position sensor, wherein the focal position movement unit adjusts the focus of the pattern of the projection grid and at the same time acquires the pattern of the projection grid corresponding to one period, while driving the object in directions of x and z axes at the same time, calculates the amplitudes of the pattern of the projection grid, and acquires the information on the three-dimensional profile of the object.

To accomplish the above-mentioned objects, according to a fourth aspect of the present invention, there is provided a three-dimensional profile measurement method using the amplitude size of a projection grid, through a three-dimensional profile measurement apparatus having a pattern projection unit for projecting a pattern of the projection grid onto an object to be measured having an arbitrary height, an image acquisition unit having an image sensor for acquiring a pattern image projected onto the object, a focal position movement unit for adjusting the focal position between the pattern projection unit and the image acquisition unit so as to obtain the vivid image of the pattern of the projection grid projected onto the object, a position sensor for detecting the quantity of the focal position moved, a controller for receiving the pattern image of the projection grid acquired by the image sensor and a signal from the position sensor detecting the quantity of the focal position moved, and a calculation unit for calculating the height of the object by calculating the image of the image sensor inputted to the controller and the position input signal received from the position sensor, the method including the steps of: arranging a plurality of pixels of the image sensor so that the images of the points of the object corresponding thereto are acquired; moving the focal position movement unit and at the same time projecting the pattern of the projection grid onto the object so as to obtain vivid image of the pattern of the projection grid projected onto the object; acquiring focal position information on the object and at the same time acquiring the patterns of the projection grid corresponding to one period; calculating the amplitude of the pattern of the projection grid from each pixel in the acquired images; and determining the highest amplitude value of the pattern of the projection grid at each pixel.

Advantageous Effects

According to the present invention, the three-dimensional profile measurement apparatus and method according to the present invention can provide an appropriate measuring result, under the situations wherein the object has a high difference in height and mechanical vibrations exist, thus completely satisfying a user's demand.

In addition, the three-dimensional profile measurement apparatus and method according to the present invention can move the object at a given inclination angle (in the directions of the x and z axes) to obtain the phase moving effect and the amplitude size (focus moving effect) of the pattern of the projection grid, at the same time, so that the driving of the projection grid and the movement of the object are at a time achieved, thus improving the measurement speed.

Further, the three-dimensional profile measurement apparatus and method according to the present invention can move the object in the directions of the x and z axes at the same time to obtain the phase acquisition of the projection grid and the focus moving effect, so that there is no need to separately drive the projection grid upon the focus movement, thus allowing the configuration to be simplified.

MODE FOR INVENTION

Hereinafter, an explanation on three-dimensional profile measurement apparatus and method using the amplitude size of a projection grid according to preferred embodiments of the present invention will be in detail given with reference to the attached drawing.

While the present invention will be described with reference to the particular illustrative embodiments, it is not to be restricted by the embodiments but only by the appended claims. It is to be appreciated that those skilled in the art can change or modify the embodiments without departing from the scope and spirit of the present invention.

Figure 1:
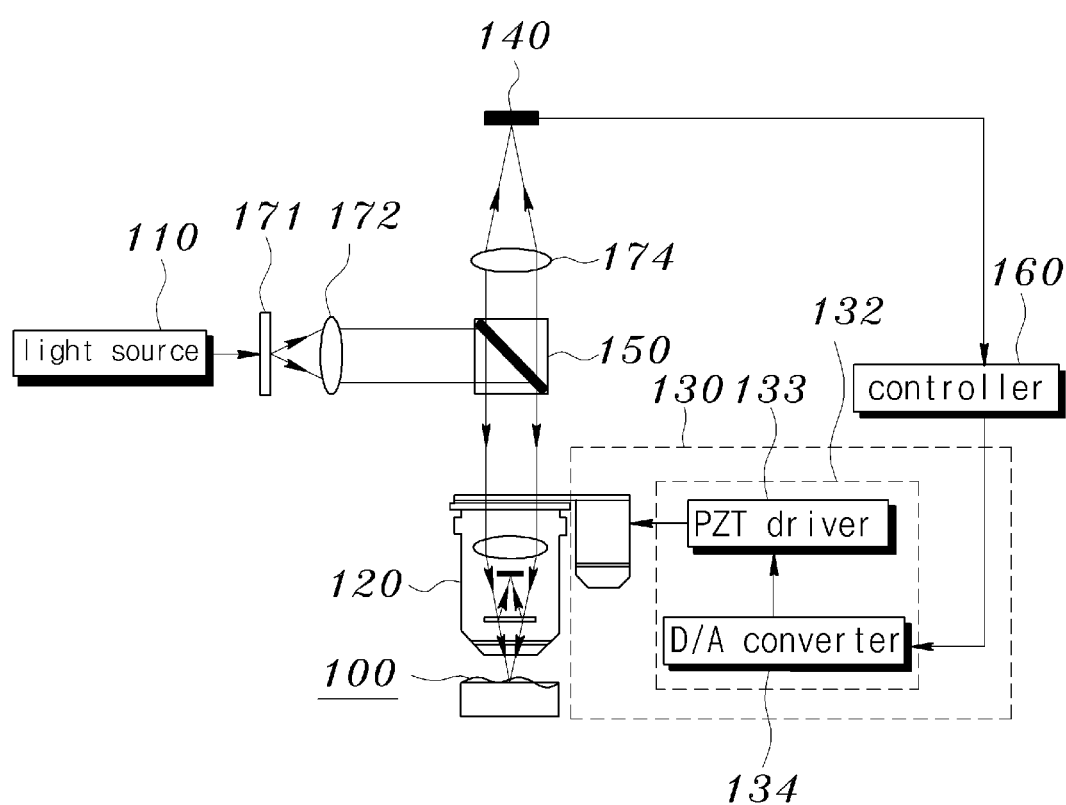
FIG. 1 shows a conventional measurement apparatus using a white-light interferometer.
Figure 2:
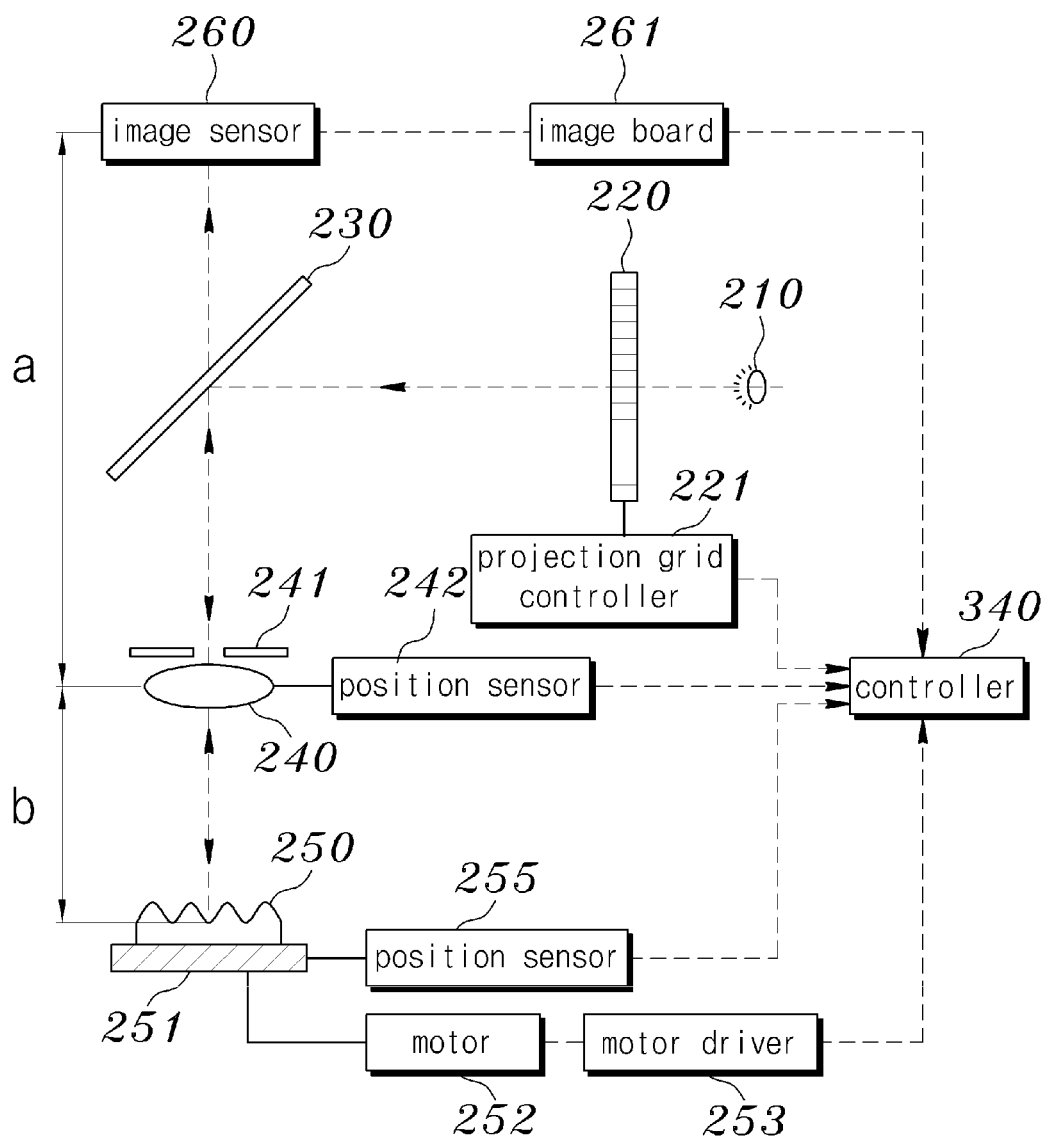
FIG. 2 shows an optical system wherein a three-dimensional profile measurement apparatus using the amplitude size of a projection grid according to a first embodiment of the present invention is adopted.
Figure 3:
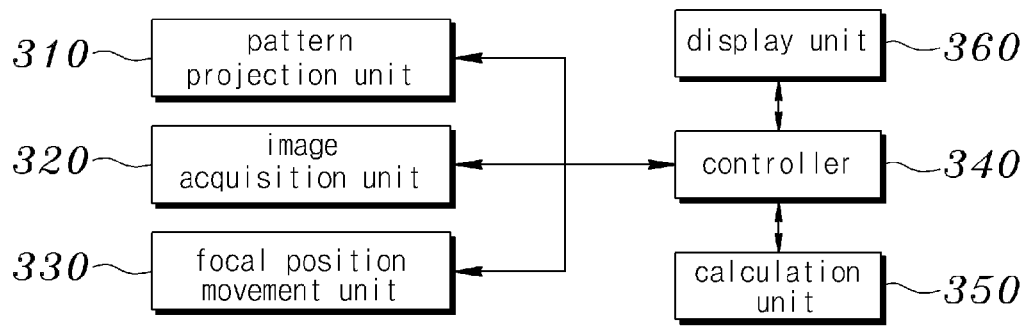
FIG. 3 is a block diagram showing the three-dimensional profile measurement apparatus according to the first embodiment of the present invention.
Figure 4:
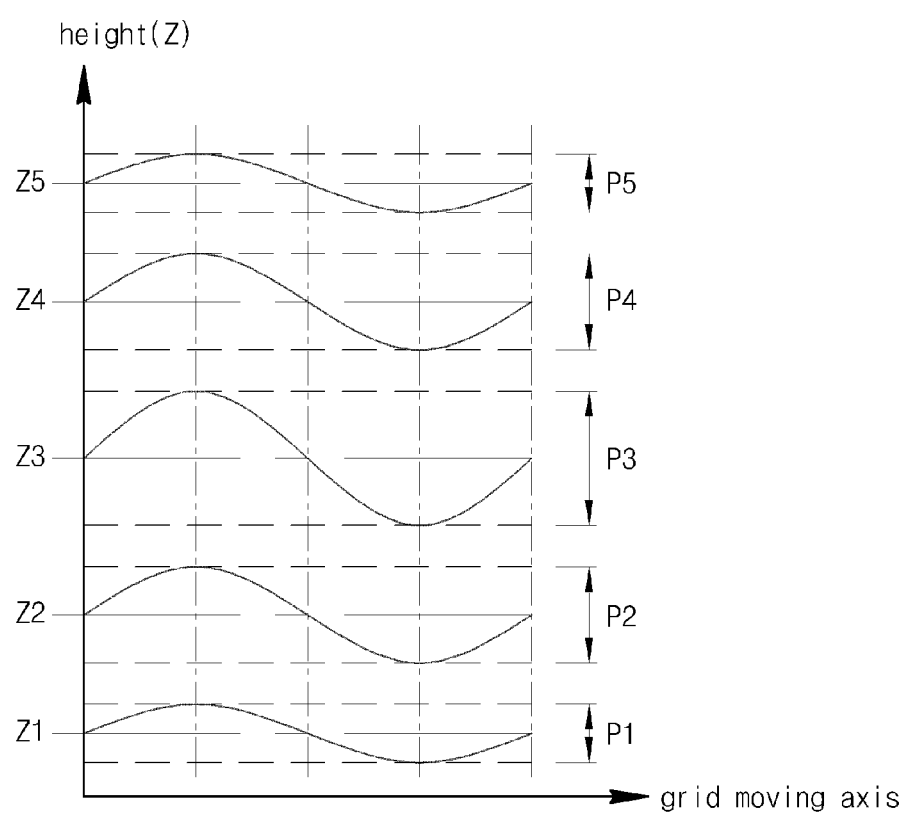
FIG. 4 is a graph showing the amplitude sizes varied in accordance with the heights of an object to be measured.
Figure 5:
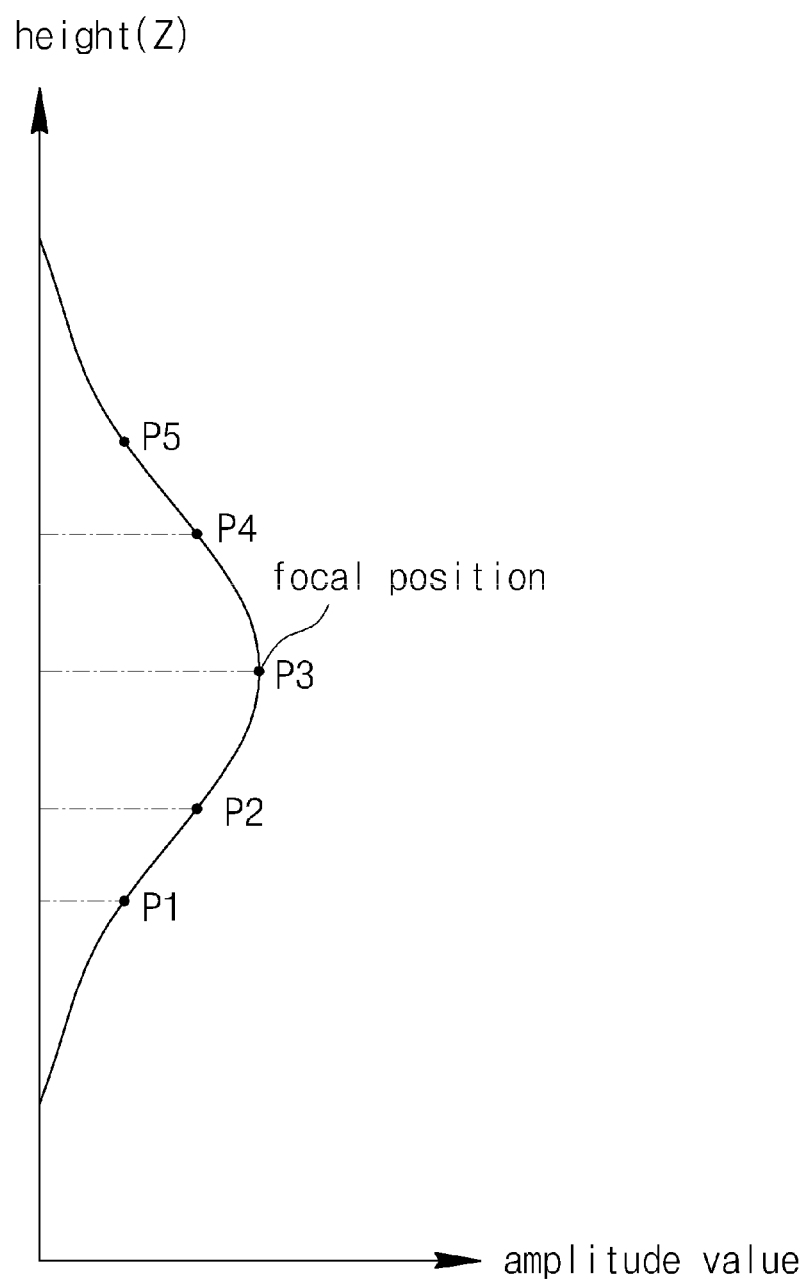
FIG. 5 is a graph showing the amplitude sizes varied in accordance with focal positions.

FIG. 2 shows an optical system wherein a three-dimensional profile measurement apparatus using the amplitude size of a projection grid according to a first embodiment of the present invention is adopted, FIG. 3 is a block diagram showing the three-dimensional profile measurement apparatus according to the first embodiment of the present invention, FIG. 4 is a graph showing the amplitude sizes varied in accordance with the heights of an object to be measured, and FIG. 5 is a graph showing the amplitude sizes varied in accordance with focal positions.

As shown, a three-dimensional profile measurement apparatus according to a first embodiment of the present invention includes: a pattern projection unit 310 for projecting a pattern of a projection grid 220 onto an object 250 to be measured having an arbitrary height; an image acquisition unit 320 having an image sensor 260 for acquiring a pattern image projected onto the object 250; a focal position movement unit 330 for adjusting the focal position between the pattern projection unit 310 and the image acquisition unit 320 so as to obtain the vivid image of the pattern of the projection grid projected onto the object 250; a position sensor for detecting the quantity of the focal position moved; a controller 340 for receiving the pattern image of the projection grid acquired by the image sensor 260 and a signal from the position sensor detecting the quantity of the focal position moved; and a calculation unit 350 for calculating the height of the object 250 by calculating the image of the image sensor 260 inputted to the controller 340 and the position input signal received from the position sensor.

Referring to FIG. 2 showing the three-dimensional profile measurement apparatus according to the first embodiment of the present invention, the pattern projection unit 310 for projecting a pattern onto the object 250 includes a light source 210 for providing light to the object 250, the projection grid 220 disposed in front of the light source 210 and having a periodical component projected onto the object 250 through the reception of the light provided from the light source 210, and a projection grid controller 221 for controlling the projection position of the projection grid 220. In this case, the projection grid 220 desirably has the periodical component having a plurality of striped patterns equally spaced apart from each other.

Further, the image acquisition unit 320 for acquiring the pattern image projected onto the object 250 includes the image sensor 260 for acquiring the pattern image of the projection grid 220 projected onto the object 250, an image board 261 for transmitting the pattern image acquired by the image sensor 260 to the controller 340, and an objective lens 240 disposed between the image sensor 260 and the object 250.

The above-mentioned optical system has a structure wherein the projection grid 220 is projected onto the object 250 through the objective lens 240.

Figure 6:
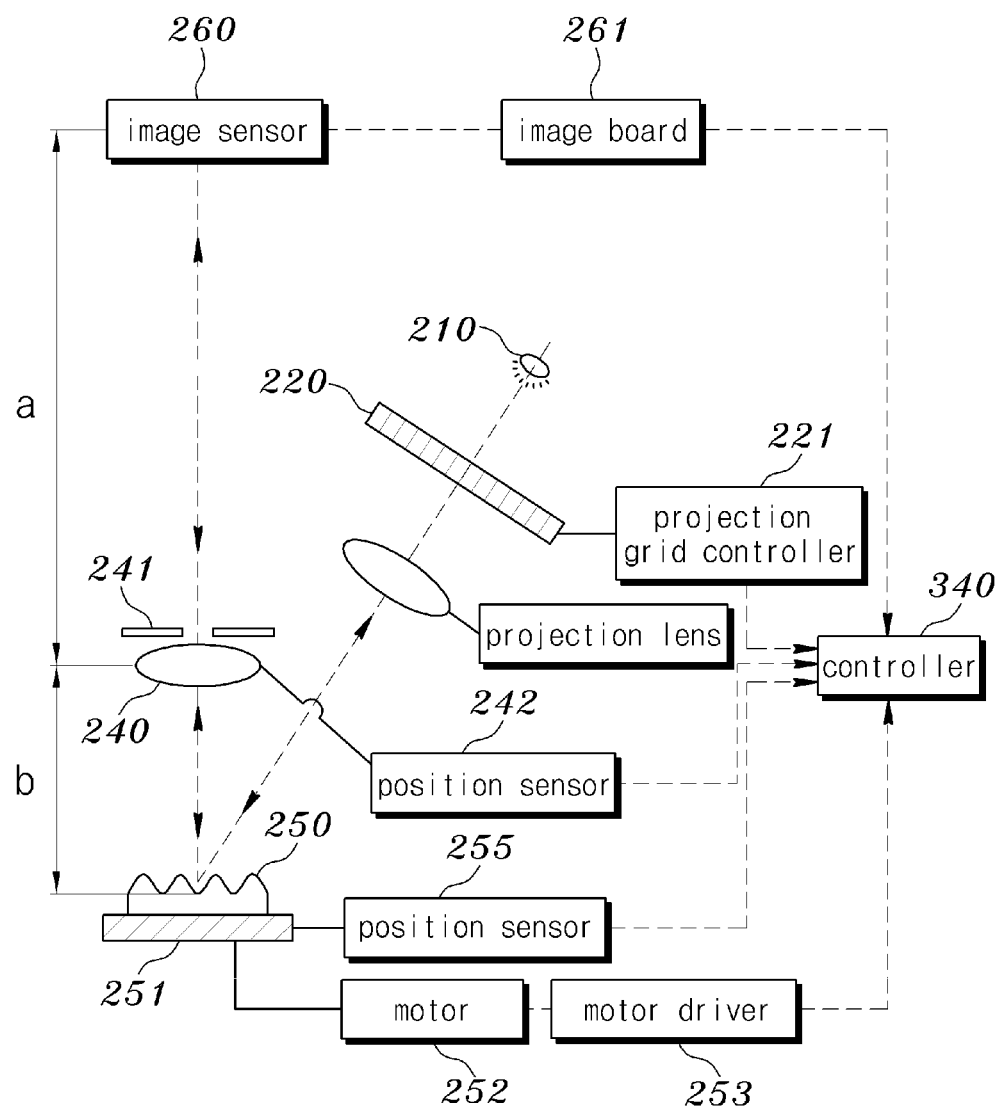
FIG. 6 shows the three-dimensional profile measurement apparatus according to the first embodiment of the present invention is adopted, wherein a projection lens is further provided.

As shown in FIG. 2, that is, the projection grid 220 is projected onto the object 250 through the objective lens 240, but a pattern projection unit having a projection lens may be disposed separately from an image acquisition unit, so that the projection grid 220 may be projected onto the object 250, not through the objective lens 240 (see FIG. 6).

When the projection grid 220 is projected onto the object 250, as shown in FIG. 2, the projection is conducted through the objective lens 240, and in this case, the pattern projection unit 310 includes the light source 210 for providing light to the object 250, the projection grid 220 disposed in front of the light source 210 and having the periodical component projected onto the object 250 through the reception of the light provided from the light source 210, and the projection grid controller 221 for controlling the projection position of the projection grid 220, while having no separate projection lens.

The image acquisition unit 320 includes the image sensor 260 for acquiring the pattern image of the projection grid 220 projected onto the object 250, the image board 261 for transmitting the pattern image acquired by the image sensor 260 to the controller 340, and the objective lens 240 disposed between the image sensor 260 and the object 250. Further, the image acquisition unit 320 includes a beam splitter 230 disposed between the image sensor 260 and the objective lens 240, and the projection grid 220 of the pattern projection unit 310 is projected onto the object 250 through the beam splitter 230 and the objective lens 240.

The focal position movement unit 330 moves the object 250 upwards and downwards, moves only the objective lens 240 upwards and downwards, moves only the image acquisition unit 320 upwards and downwards, or moves both of the pattern projection unit 310 and the image acquisition unit 320 upwards and downwards. If the object 250 moves upwards and downwards, a position sensor 255 is mounted on a table 251 on which the object 250 is located, and if only the objective lens 240 moves upwards and downwards, a position sensor 242 is mounted on a housing of the objective lens 240. On the other hand, if only the image acquisition unit 320 moves upwards and downwards, a position sensor is mounted on the image acquisition unit 320, and if both of the pattern projection unit 310 and the image acquisition unit 320 move upwards and downwards, position sensors are mounted on both of the pattern projection unit 310 and the image acquisition unit 320. Accordingly, after the projection grid 220 is projected onto the object 250 through the reception of the light from the light source 210, the amplitude sizes of the projection grid 220 varied according to the movements of the focal position movement unit 330 are analyzed, thus measuring the height of the object 250.

The structure wherein the object 250 moves upwards and downwards, only the objective lens 240 moves upwards and downwards, only the image acquisition unit 320 moves upwards and downwards, or both of the pattern projection unit 310 and the image acquisition unit 320 move upwards and downwards can be built by those skilled in the art. Therefore, a detailed explanation on the structure will be avoided, but for your understanding, the structure wherein the object 250 moves upwards and downwards will be explained briefly.

At this time, the focal position movement unit 330 desirably includes the table 251 on which the object 250 is located, a motor 252 and a motor driver 253 for moving the table 251 upwards and downwards, and the position sensor 255 for measuring the position of the table 251 upon the upward and downward movements of the table 251. In this case, the signal of the position sensor 255 is transmitted to the controller 340 and utilized for the calculation of the position of the object 250.

According to the above-mentioned optical system, at this time, if it is assumed that a focal length of the objective lens 240 is f, a linear distance from one point of the object 250 up to the center distance of the objective lens 240 is b, and a linear distance from the objective lens 240 up to the image acquisition point of the image sensor 260 is a, the optical system is located at a position $1/f=(1/a+1/b)$ so as to allow the image of one point of the object 250 to be vividly acquired by the image sensor 260.

Further, an aperture 241 is desirably disposed between the objective lens 240 and the beam splitter 230, so as to freely adjust the depth of focus.

According to the present invention, further, it is desirable that the optical system be disposed so that the focal positions between the image acquisition unit 320 and the pattern projection unit 310 correspond to each other. That is, while the focal positions are being moved, the focal positions between the image acquisition unit 320 and the pattern projection unit 310 correspond to each other, so that even if the focal position in the image acquisition unit 320 is moved, the image acquisition unit 320 can acquire the vivid image because the pattern of the projection grid 220 is vividly projected onto the object 250.

Referring to FIG. 3, a three-dimensional measurement process will be explained below.

The image sensor 260 has a plurality of pixels, and the pixels are disposed to acquire the images of the points of the object 250 corresponding thereto.

So as to obtain the vivid image of the pattern of the projection grid 220 projected onto the object 250, next, the focal position movement unit 330 is moved, and the quantity of focal position moved is stored.

In this case, the movement of the focal position movement unit 330 is selected from the upward and downward movements of the object 250, the upward and downward movements of only the objective lens 240, the upward and downward movements of only the image acquisition unit 320, and the upward and downward movements of both of the pattern projection unit 310 and the image acquisition unit 320.

At this time, if the object 250 moves upwards and downwards, the position sensor 255 is mounted on the table 251 on which the object 250 is located, and if only the objective lens 240 moves upwards and downwards, the position sensor 242 is mounted on the housing of the objective lens 240. On the other hand, if only the image acquisition unit 320 moves upwards and downwards, the position sensor is mounted on the image acquisition unit 320, and if both of the pattern projection unit 310 and the image acquisition unit 320 move upwards and downwards, the position sensors are mounted on both of the pattern projection unit 310 and the image acquisition unit 320.

Hereinafter, a way for moving the object 250 upwards and downwards will be in detail explained.

The object 250 is controlled and moved by a given distance upwards and downwards, and at this time, since the object 250 is mounted on the table 251, the motor driver 253 is controlled through the controller 340 to move the table 251 by the given distance, so that the object 250 is moved by the given distance.

Upon the movement of the object 250 by the given distance, the pattern of the projection gird 220 projected onto the object 250 is moved, and next, the pixels of the image sensor 260 acquire the images of the points of the object 250 corresponding thereto.

The technique for adopting and applying the way of moving only the objective lens 240 upwards and downwards, only the image acquisition unit 320 upwards and downwards, or both of the pattern projection unit 310 and the image acquisition unit 320 upwards and downwards can be easily understood by those skilled in the art, based upon the description of the present invention. Therefore, a detailed explanation on the technique will be avoided, for the brevity of the description.

Hereinafter, an explanation on the projection grid 220 and the control of the projection grid 220 will be given below.

The projection grid 220 has a plurality of striped patterns having a given period and also has the change of brightness in a form of a sine wave.

When the images are acquired through the change of the pattern of the projection grid 220, the corresponding height positions of the object 250 are transmitted to the controller 340, and at this time, the object 250 desirably stops. However, the images may be acquired while the object 250 is being moved at a low speed.

A method for changing the pattern of the projection grid 220 is conducted by moving a glass plate on which a grid is printed or by making the projection grid 220 as an LCD.

The calculation unit 350 calculates the amplitudes caused by the pattern change of the projection grid 220 from the images acquired from the pixels of the image sensor 260, and at this time, if the object 250 stops after moving by the given distance, the images are acquired while the pattern of the projection grid 220 projected onto the object 250 is being changed.

In the state where the object 250 stops after moving by the given distance, that is, while the pattern of the projection grid 220 is being changed so as to obtain the amplitudes of the projection grid 220 projected onto the object 250, the images are acquired. Next, the object 250 moves by the given distance to change the pattern of the projection grid 220, and then, the images are acquired. If the processes are repeatedly carried out, the amplitude sizes of the projection grid 220 can be obtained from the images acquired from the respective positions of the object 250 through the pixels of the image sensor 260.

FIG. 4 shows the amplitude sizes obtained at the respective positions z1, z2, z3, z4 and z5 of the object 250 at one point of the object 250 corresponding to one pixel of the image sensor 260.

If it is assumed that the most vivid image is acquired (most focused) from the image sensor 260 at the position z3 in FIG. 4, the images are out of focus at the positions deviated from the position z3, thus reducing the amplitude sizes of the pattern of the projection grid 220.

That is, if it is assumed that the amplitude sizes at the positions z1 and z2 (lower than the position z3) are p1 and p2, the amplitude sizes at the positions z4 and z5 (upper than the position z3) are p4 and p5, and the amplitude size at the position z3 well focused is p3, it is appreciated that the amplitude size of p3 is highest.

Accordingly, if it is assumed that the respective points of the object 250 corresponding to each pixel of the image sensor 260 are [p(x, y)x=1,,n y=1,,n], the amplitude acquired from each pixel is obtained and the highest amplitude size of the projection grid 220 is determined as the height of each point of the object 250, thus obtaining data on the heights of all points of the object 250.

Like this, when the amplitude size of the pattern of the projection grid 220 is highest from the image obtained from each pixel of the image sensor 260, the height of the corresponding point of the object 250 is determined as the height of the point of the object 250, and the heights of the points of the object 250 corresponding to all pixels are determined as the heights of the corresponding points of the object 250 when the amplitude sizes are highest, so that the height values of all points of the object 250 can be obtained.

FIG. 5 is a graph showing the amplitude sizes of the projection grid 220 obtained from the corresponding pixels when one point of the object 250 is on focus and out of focus, wherein the amplitude size is highest at the focal position and reduced when deviated upwardly and downwardly from the focal position.

Hereinafter, a three-dimensional profile measurement method using the amplitude size of the projection grid according to the present invention will be explained.

According to the present invention, the three-dimensional profile measurement method using the amplitude size of the projection grid, through a three-dimensional profile measurement apparatus having a pattern projection unit for projecting a pattern of the projection grid onto an object to be measured having an arbitrary height; an image acquisition unit having an image sensor for acquiring a pattern image projected onto the object; a focal position movement unit for adjusting the focal position between the pattern projection unit and the image acquisition unit so as to obtain the vivid image of the pattern of the projection grid projected onto the object; a position sensor for detecting the quantity of the focal position moved; a controller for receiving the pattern image of the projection grid acquired by the image sensor and a signal from the position sensor detecting the quantity of the focal position moved; and a calculation unit for calculating the height of the object by calculating the image of the image sensor inputted to the controller and the position input signal received from the position sensor, the method including the steps of: arranging a plurality of pixels of the image sensor so that the images of the points of the object corresponding thereto are acquired; moving the focal position movement unit so as to obtain vivid image of the pattern of the projection grid projected onto the object and storing the quantity of focal position moved; projecting the pattern of the projection grid having a periodical component onto the object; acquiring the image of the object onto which the pattern of the projection grid is projected; projecting the pattern of the projection grid onto the object, while moving the projection grid within one period; calculating the amplitude of the pattern of the projection grid from each pixel in the acquired image; and determining the highest amplitude value of the pattern of the projection grid at each pixel.

According to the present invention, at the step of moving the focal position movement unit, the object moves upwards and downwards, only an objective lens moves upwards and downwards, only the image acquisition unit moves upwards and downwards, or both of the pattern projection unit and the image acquisition unit move upwards and downwards, so that if the object moves upwards and downwards, the position sensor is mounted on a table on which the object is located, if only the objective lens moves upwards and downwards, the position sensor is mounted on a housing of the objective lens, if only the image acquisition unit moves upwards and downwards, the position sensor is mounted on the image acquisition unit, and if both of the pattern projection unit and the image acquisition unit move upwards and downwards, the position sensors are mounted on the pattern projection unit and the image acquisition unit.

After determining the highest amplitude value of the pattern of the projection grid at each pixel, the method further includes the step of determining the height of the point of the object corresponding to each pixel as the height of the corresponding point of the object through the stored information on the quantity of focal position moved when the amplitude size is highest at the step of determining the highest amplitude value of the pattern of the projection grid at each pixel.

After that step, the method according to the present invention further includes the step of determining the heights of the points of the object corresponding to all pixels, connecting the points of the object to each other, and displaying the whole profile of the object.

On the other hand, an explanation on a three-dimensional profile measurement apparatus using the amplitude size of a projection grid according to second and third embodiments of the present invention will be given with reference to FIGS. 7 to 9, wherein the amplitude of the projection grid and the amplitude size thereof are at the same time acquired.

Figure 7:
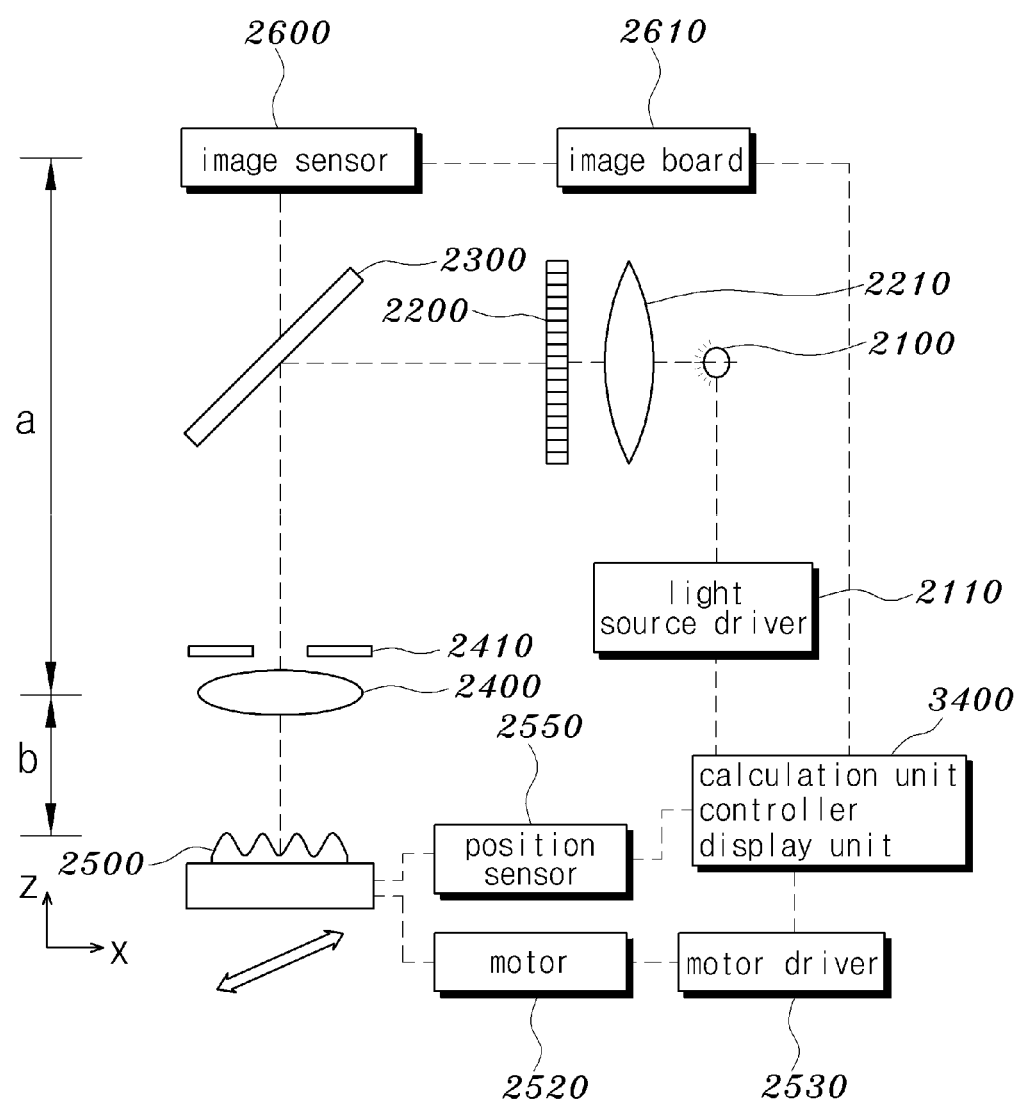
FIG. 7 shows an optical system wherein a three-dimensional profile measurement apparatus using the amplitude size of a projection grid according to a second embodiment of the present invention is adopted.

FIG. 7 shows a three-dimensional profile measurement apparatus using the amplitude size of a projection grid according to the second embodiment of the present invention.

As shown in FIG. 7, the three-dimensional profile measurement apparatus according to the second embodiment of the present invention includes: a pattern projection unit 3100 for projecting a pattern of a projection grid 2200 onto an object 2500 to be measured having an arbitrary height; an image acquisition unit 3200 having an image sensor 2600 for acquiring a pattern image projected onto the object 2500; a focal position movement unit 3300 for adjusting the focal position between the pattern projection unit 3100 and the image acquisition unit 3200 so as to obtain the vivid image of the pattern of the projection grid 2200 projected onto the object 2500; a position sensor for detecting the quantity of focal position moved; a controller 3400 for receiving the pattern image of the projection grid 2200 acquired by the image sensor 2600 and a signal from the position sensor detecting the quantity of focal position moved; and a calculation unit 3500 for calculating the height of the object 2500 by calculating the image of the image sensor 2600 inputted to the controller 3400 and the position input signal received from the position sensor, wherein the focal position movement unit 3300 adjusts the focus of the pattern of the projection grid 2200 and at the same time acquires the pattern of the projection grid 2200 corresponding to one period, while driving the object 2500 in directions of x and z axes at the same time, calculates the amplitudes of the pattern of the projection grid 2200, and acquires the information on the three-dimensional profile of the object 2500.

So as to conduct the periodic acquisition of the pattern of the projection grid 2200 and the focus acquisition of reflection light, according to the second embodiment of the present invention, the object 2500 is driven in the directions of x and z axes at the same time to satisfy the phase moving effect (by obtaining the amplitude of the projection grid 2200 according to a bucket period) of the projection grid 2200 and the focal position moving effect at the same time, thus acquiring the information on the three-dimensional profile of the object 2500.

The pattern projection unit 3100 for projecting the pattern onto the object 2500 includes a light source 2100 for providing light to the object 2500 and the projection grid 2200 disposed in front of the light source 2100 and having a periodical component projected onto the object 2500 through the reception of the light provided from the light source 2100. In this case, the projection grid 2200 desirably has the periodical component having a plurality of striped patterns equally spaced apart from each other.

Further, the image acquisition unit 3200 for acquiring the pattern image projected onto the object 2500 includes the image sensor 2600 for acquiring the pattern image of the projection grid 2200 projected onto the object 2500, an image board 2610 for transmitting the pattern image acquired by the image sensor 2600 to the controller 3400, and an objective lens 2400 disposed between the image sensor 2600 and the object 2500.

Further, the image acquisition unit 3200 includes a beam splitter 2300 disposed between the image sensor 2600 and the objective lens 2400, and the projection grid 2200 of the pattern projection unit 3100 is projected onto the object 2500 through the beam splitter 2300 and the objective lens 2400.

On the other hand, the focal position movement unit 3300 drives the object 2500 at a given inclination angle, that is, in the directions of x and z axes at the same time. Accordingly, the movement of the object 2500 in the direction of the x axis causes the phase moving effect of the projection grid 2200, and the movement of the object 2500 in the direction of the z axis causes the focal position moving effect. As a result, the three-dimensional profile measurement apparatus according to the second embodiment of the present invention does not need any driver (a projection grid driver in the conventional practice) for bucket-driving the projection grid, and as the object 2500 is driven in the directions of the x and z axes at the same time, the amplitude and the amplitude size of the projection grid can be all obtained.

The focal position movement unit 3300 includes one stage having a motor 2520 for driving the object 2500 and a position sensor 2550 for detecting a movement value, and further includes a motor driver 2530 for controlling the motor 2520.

Figure 8:
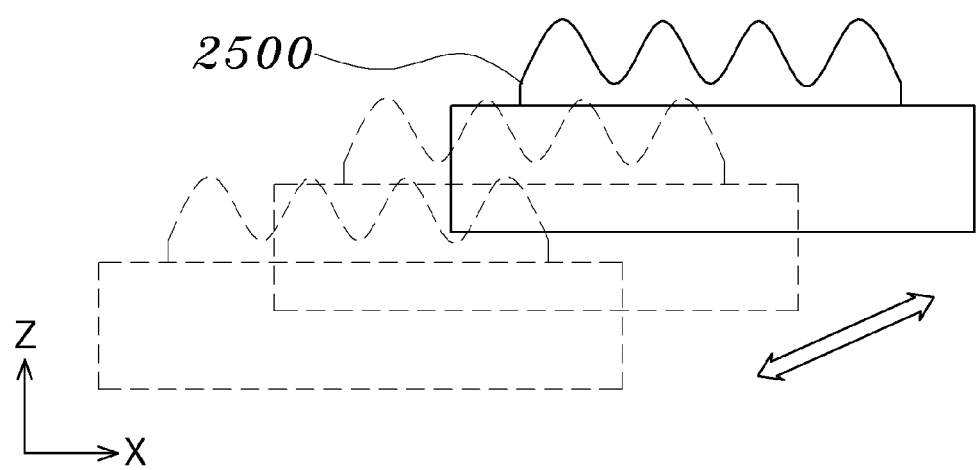
FIG. 8 shows the movements of the object in the apparatus in FIG. 7.

FIG. 8 shows the movements of the object 2500 in the three-dimensional profile measurement apparatus as shown in FIG. 7. As mentioned above, the focal position movement unit 3300 includes one stage having the motor 2520 and the position sensor 2550 for driving the object 2500 in the directions of the x and z axes at the same time. As shown in FIG. 8, the object 2500 is moved at the given inclination angle, so that the movement of the object 2500 in the direction of the x axis causes the phase moving effect of the projection grid 2200, and the movement of the object 2500 in the direction of the z axis causes the focal position moving effect. The movement values in the directions of the x and z axes are obtained through the position sensor 2550, and after that, they are transmitted to the calculation unit 3500 and used to obtain the information on the heights of the object 2500.

Next, a three-dimensional profile measurement method through the three-dimensional profile measurement apparatus according to the second embodiment of the present invention will be explained below.

The three-dimensional profile measurement method includes the steps of: arranging a plurality of pixels of the image sensor 2600 so that the images of the points of the object corresponding thereto are acquired; moving the focal position movement unit 3300 and at the same time projecting the pattern of the projection grid 2200 onto the object 2500 so as to obtain vivid image of the pattern of the projection grid 2200 projected onto the object 2500; acquiring focal position information on the object 2500 and at the same time acquiring the patterns of the projection grid 2200 corresponding to one period; calculating the amplitude of the pattern of the projection grid from each pixel in the acquired images; and determining the highest amplitude value of the pattern of the projection grid at each pixel.

While the object 2500 is driven in the directions of the x and z axes, in more detail, the moving value detected through the position sensor 2550 is provided to the calculation unit 3500, and further, the sizes acquired from the plurality of pixels of the image sensor 2600 are acquired by the image acquisition unit 3200 and provided through the image board 2610 to the calculation unit 3500. At this time, the moving value with respect to the z axis acquired from the focal position movement unit 3300 corresponds to the information on the focus for providing vivid image.

The moving value with respect to the x axis is compensated to obtain the amplitude of the pattern of the projection grid 2200, and if the amplitude of the projection grid 2200 obtained from each point of the object 2500 is continuously obtained in the direction of the x axis, the amplitude size of the projection grid 220 can be acquired through the images obtained from the respective positions of the object 2500 through each pixel of the image sensor 2600. If it is assumed that the most vivid image (which is well focused) is acquired through the image sensor 2600, the images are out of focus at the positions deviated from the most focused region to reduce the amplitude value of the projection grid 2200 at the positions. Accordingly, the point having the highest amplitude value is determined, and at this point, the quantity of focal position moved (moving value) is compensated to obtain the information on the height of the object 2500.

While driving the object 2500 in the directions of the x and z axes at the same time, that is, the moving value with respect to the direction of the x axis is compensated to obtain the amplitude of the pattern of the projection grid 2200, and the moving value with respect to the direction of the z axis is compensated to determine the information on the optimal focus at which the most vivid image of the object 2500 is obtained.

After determining the highest amplitude value of the pattern of the projection grid at each pixel, that is, the measurement method further includes the step of determining the height of the point of the object 2500 corresponding to each pixel at the time when the amplitude value of the projection grid is highest as the height of the corresponding point of the object 2500, through the stored information on the quantity of focal length moved (the moving quantity in the direction of the z axis).

After that step, the measurement method according to the present invention further includes the step of determining the heights of the points of the object 2500 corresponding to all pixels, connecting the points of the object 2500 to each other, and displaying the whole profile of the object 2500.

Figure 9:
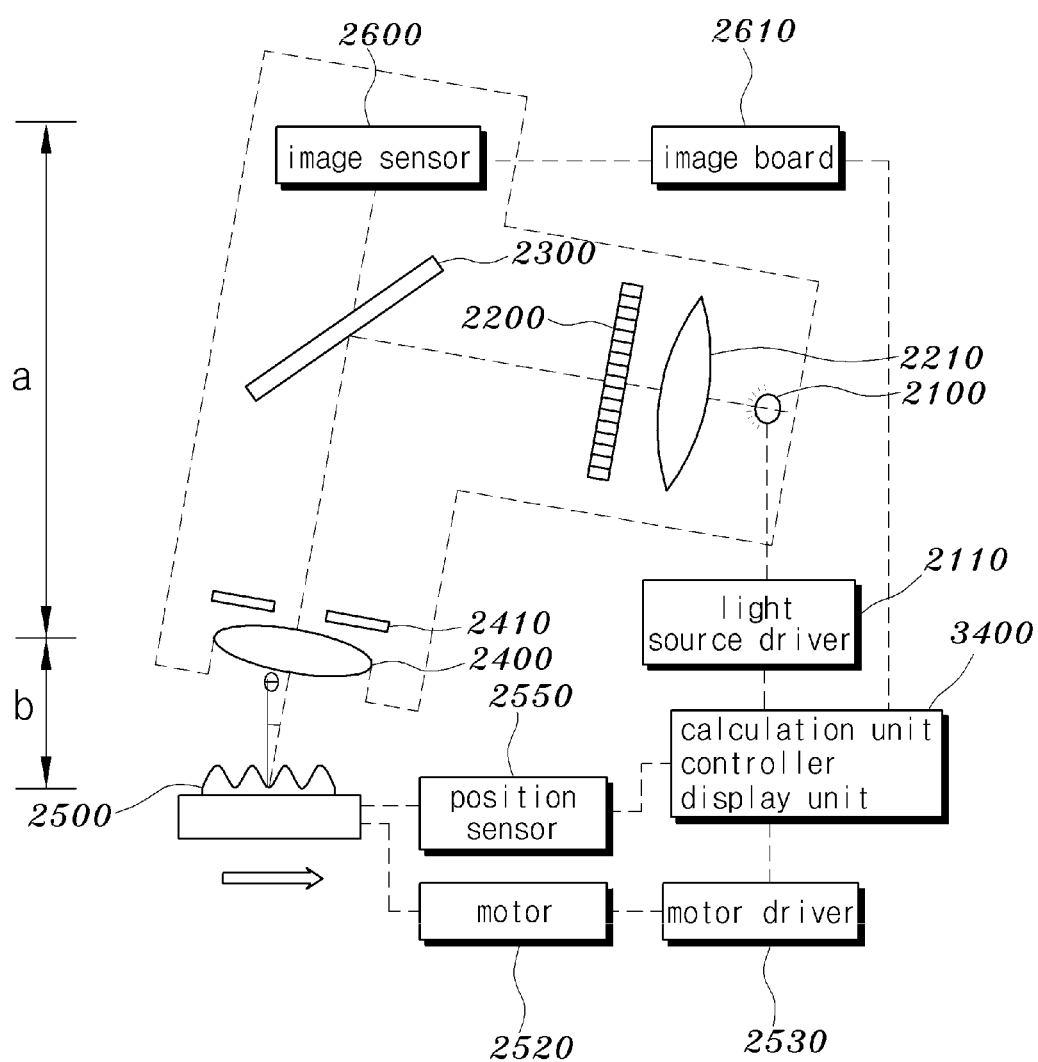
FIG. 9 shows an optical system wherein a three-dimensional profile measurement apparatus using the amplitude size of a projection grid according to a third embodiment of the present invention is adopted.

FIG. 9 shows a three-dimensional profile measurement apparatus using the amplitude size of a projection grid according to a third embodiment of the present invention. In FIG. 9, so as to at the same time conduct the phase acquisition of the projection grid and the focus movement, the object is driven in the direction of only x axis, while the projection grid is being projected at a given angle, thus acquiring the corresponding information.

Accordingly, the focus moving process for moving focus and the projection grid projecting process for projecting a pattern corresponding to one period are independently conducted from each other in the existing measuring apparatus and method, but according to the present invention, the two processes are at the same time conducted to acquire the corresponding information, thus more rapidly obtaining the information on the three-dimensional profile of the object and providing a simple configuration.

The invention claimed is:

1. A three-dimensional profile measurement apparatus using the amplitude of a projection grid, the apparatus comprising:
   a pattern projection unit for projecting a pattern of the projection grid onto an object to be measured having an arbitrary height;
   an image acquisition unit having an image sensor for acquiring a pattern image projected onto the object;
   a focal position movement unit for adjusting the focal position between the pattern projection unit and the image acquisition unit so as to obtain the vivid image of the pattern of the projection grid projected onto the object;
   a position sensor for detecting the quantity of the focal position moved;
   a controller for receiving the pattern image of the projection grid acquired by the image sensor and a signal from the position sensor detecting the quantity of the focal position moved; and
   a calculation unit for calculating the height of the object by calculating the pattern image received by the controller and the signal from the position sensor received by the controller.

2. The three-dimensional profile measurement apparatus according to claim 1, wherein the pattern projection unit for projecting the pattern onto the object comprises:
   a light source for providing light to the object;
   the projection grid disposed in front of the light source and having a periodical component projected onto the object through a reception of the light provided from the light source;
   a projection grid controller for controlling a projection position of the projection grid; and
   a projection lens for projecting the projection grid onto the object, and
   wherein the image acquisition unit for acquiring the pattern image projected onto the object comprises:
   the image sensor for acquiring the pattern image of the projection grid projected onto the object;
   an image board for transmitting the pattern image acquired by the image sensor to the controller; and
   an objective lens disposed between the image sensor and the object.

3. The three-dimensional profile measurement apparatus according to claim 2, wherein the focal position movement unit moves the object upwards and downwards, moves only the objective lens upwards and downwards, moves only the image acquisition unit upwards and downwards, or moves both of the pattern projection unit and the image acquisition unit upwards and downwards, so that if the object moves upwards and downwards, the position sensor is mounted on a table on which the object is located, if only the objective lens moves upwards and downwards, the position sensor is mounted on a housing of the objective lens, if only the image acquisition unit moves upwards and downwards, the position sensor is mounted on the image acquisition unit, and if both of the pattern projection unit and the image acquisition unit move upwards and downwards, the position sensors are mounted on both of the pattern projection unit and the image acquisition unit, whereby after the projection grid is projected onto the object through the reception of the light from the light source, the amplitude sizes of the projection grid varied according to the movements of the focal position movement unit are analyzed, thus measuring the heights of the object.

4. The three-dimensional profile measurement apparatus according to claim 3, wherein so as to allow the focal positions between the image acquisition unit and the pattern projection unit to correspond to each other, the units of the apparatus are disposed, so that while the focal positions are being moved, the focal positions between the image acquisition unit and the pattern projection unit correspond to each other.

5. The three-dimensional profile measurement apparatus according to claim 4, wherein the image sensor has a plurality of pixels disposed to acquire the images of the points of the object corresponding thereto, and as the focal position movement unit is moved upwards and downwards by a given distance, the images of the points of the object are obtained from the pixels of the image sensor, so that when the projection grid is moved to obtain the images of the object, the height information of the focal position movement unit is transmitted to the controller, and the calculation unit calculates the amplitudes of the projection grid according to the movements from the images acquired from the pixels to acquire the height of the point of the object corresponding to each pixel from the height information of the focal position movement unit when the amplitude size is highest from the image obtained from each pixel, and to acquire the heights of all points of the object corresponding to the pixels from the height information of the focal position movement unit when the amplitude size is highest from the images obtained from the pixels.

6. The three-dimensional profile measurement apparatus according to claim 2, wherein an aperture is disposed over the objective lens.

7. The three-dimensional profile measurement apparatus according to claim 1, wherein the pattern projection unit for projecting the pattern onto the object comprises:

a light source for providing light to the object;

the projection grid disposed in front of the light source and having a periodical component projected onto the object through a reception of the light provided from the light source; and a projection grid controller for controlling a projection position of the projection grid, and wherein the image acquisition unit for acquiring the pattern image projected onto the object comprises:

the image sensor for acquiring the pattern image of the projection grid projected onto the object;

an image board for transmitting the pattern image acquired by the image sensor to the controller;

an objective lens disposed between the image sensor and the object; and a beam splitter disposed between the image sensor and the objective lens, whereby the projection grid of the pattern projection unit is projected onto the object through the beam splitter and the objective lens.

8. The three-dimensional profile measurement apparatus according to claim 7, wherein the focal position movement unit moves the object upwards and downwards, moves only the objective lens upwards and downwards, moves only the image acquisition unit upwards and downwards, or moves both of the pattern projection unit and the image acquisition unit upwards and downwards, so that if the object moves upwards and downwards, the position sensor is mounted on a table on which the object is located, if only the objective lens moves upwards and downwards, the position sensor is mounted on a housing of the objective lens, if only the image acquisition unit moves upwards and downwards, the position sensor is mounted on the image acquisition unit, and if both of the pattern projection unit and the image acquisition unit move upwards and downwards, the position sensors are mounted on both of the pattern projection unit and the image acquisition unit, whereby after the projection grid is projected onto the object through the reception of the light from the light source, the amplitude sizes of the projection grid varied according to the movements of the focal position movement unit are analyzed, thus measuring the heights of the object.

9. The three-dimensional profile measurement apparatus according to claim 7, wherein an aperture is disposed over the objective lens.

10. The three-dimensional profile measurement apparatus according to claim 1, wherein an aperture is disposed over the objective lens.

11. A three-dimensional profile measurement method using the amplitude of a projection grid, through a three-dimensional profile measurement apparatus having a pattern projection unit for projecting a pattern of the projection grid onto an object to be measured having an arbitrary height, an image acquisition unit having an image sensor for acquiring a pattern image projected onto the object, a focal position movement unit for adjusting the focal position between the pattern projection unit and the image acquisition unit so as to obtain the vivid image of the pattern of the projection grid projected onto the object, a position sensor for detecting the quantity of the focal position moved, a controller for receiving the pattern image of the projection grid acquired by the image sensor and a signal from the position sensor detecting the quantity of the focal position moved, and a calculation unit for calculating the height of the object by calculating the pattern image received by the controller and the signal from the position sensor received by the controller, the method comprising the steps of:

(a) arranging a plurality of pixels of the image sensor so that the images of the points of the object corresponding thereto are acquired;

(b) moving the focal position movement unit so as to obtain vivid image of the pattern of the projection grid projected onto the object and storing the quantity of focal position moved;

(c) projecting the pattern of the projection grid having a periodical component onto the object;

(d) acquiring the image of the object onto which the pattern of the projection grid is projected;

(e) projecting the pattern of the projection grid onto the object, while moving the projection grid within one period;

(f) calculating the amplitude of the pattern of the projection grid from each pixel in the acquired image; and (g) determining the highest amplitude value of the pattern of the projection grid at each pixel.

12. The three-dimensional profile measurement method according to claim 11, further comprising the step of (h) determining the height of the point of the object corresponding to each pixel when the amplitude size is highest at the step of (g) as the height of the corresponding point of the object, through the stored information on the quantity of focal position moved.

13. The three-dimensional profile measurement method according to claim 12, further comprising the step of (i) determining the heights of the points of the object corresponding to all pixels, connecting the points of the object to each other, and displaying the whole profile of the object.

14. A three-dimensional profile measurement apparatus using the amplitude of a projection grid, the apparatus comprising:

a pattern projection unit for projecting a pattern of the projection grid onto an object to be measured having an arbitrary height;

an image acquisition unit having an image sensor for acquiring a pattern image projected onto the object;

a focal position movement unit for adjusting the focal position between the pattern projection unit and the image acquisition unit so as to obtain the vivid image of the pattern of the projection grid projected onto the object;

a position sensor for detecting the quantity of the focal position moved;

a controller for receiving the pattern image of the projection grid acquired by the image sensor and a signal from the position sensor detecting the quantity of the focal position moved; and a calculation unit for calculating the height of the object by calculating the pattern image received by the controller and the signal from the position sensor received by the controller, wherein the focal position movement unit adjusts the focus of the pattern of the projection grid and at the same time acquires the pattern of the projection grid corresponding to one period, while driving the object in directions of x and z axes at the same time, calculates the amplitudes of the pattern of the projection grid, and acquires the information on the three-dimensional profile of the object.

15. The three-dimensional profile measurement apparatus according to claim 14, wherein the pattern projection unit for projecting the pattern onto the object comprises:

a light source for providing light to the object;

the projection grid disposed in front of the light source and having a periodical component projected onto the object through a reception of the light provided from the light source; and a projection grid controller for controlling a projection position of the projection grid, and wherein the image acquisition unit for acquiring the pattern image projected onto the object comprises:

the image sensor for acquiring the pattern image of the projection grid projected onto the object;

an image board for transmitting the pattern image acquired by the image sensor to the controller;

an objective lens disposed between the image sensor and the object; and a beam splitter disposed between the image sensor and the objective lens, whereby the projection grid of the pattern projection unit is projected onto the object through the beam splitter and the objective lens.

16. The three-dimensional profile measurement apparatus according to claim 14, wherein the focal position movement unit comprises one stage having a motor for moving the object in the directions of the x and z axes at the same time and the position sensor for detecting the moving value.

17. The three-dimensional profile measurement apparatus according to claim 14, wherein the image sensor has a plurality of pixels disposed to acquire the images of the points of the object corresponding thereto, and as the object is moved in the directions of the x and z axes at the same time and the focal position movement unit is moved by a given distance, the images of the points of the object corresponding to each pixel of the image sensor are obtained and at the same time the amplitude of the projection grid is calculated in the calculation unit, so that the amplitude size is highest in the image obtained from each pixel, the height of the point of the object corresponding to the pixel is acquired from the height information of the focal position movement unit, and the heights of all points of the object corresponding to the pixels of the image sensor are acquired from the height information of the focal position movement unit at the time when the amplitude size is highest in the image obtained from each pixel.

* * * * *